United States Patent [19]

Chang et al.

[11] 3,925,156

[45] Dec. 9, 1975

[54] MICROBIOLOGICAL PROCESS FOR PREPARING 2-SUBSTITUTED-4-(R)-HYDROXY-CYCLO-PENTANE-1,3-DIONES

[75] Inventors: Lung Ting Chang, Elkhart, Ind.; Carol Ann Terry, Cassopolis, Mich.

[73] Assignee: Miles Laboratories, Inc., Elkhart, Ind.

[22] Filed: Dec. 10, 1973

[21] Appl. No.: 423,257

[52] U.S. Cl. .............................................. 195/51 R
[51] Int. Cl.$^2$ ........................................ C07B 29/02
[58] Field of Search ................................ 195/51 R

[56] References Cited
UNITED STATES PATENTS
3,773,622  11/1973  Sih .................................. 195/51 R Primary Examiner—Alvin E. Tanenholtz
Attorney, Agent, or Firm—Myron B. Sokolowski

[57] ABSTRACT

The conversion of a 2-substituted-cyclopentane-1,3,4-trione or a 2-substituted-3-alkoxy-cyclopent-2-ene-1,4-dione substrate to a 2-substituted-4(R)-hydroxy-cyclopentane-1,3-dione by a microorganism of the class Ascomycetes is improved by: incubation of the microorganism in a medium having a minimum carbohydrate concentration of from 0.1 to 1% and a pH of from 4 to 5 until a concentration of microorganism of 20 to 35% is obtained in the medium; subsequent addition of substrate at a rate of from 0.4 gram to 1.0 gram per hour per 10 liters of mediums; and maintenance of the carbohydrate concentration and pH of the medium during the incubation and addition steps.

11 Claims, No Drawings

MICROBIOLOGICAL PROCESS FOR PREPARING 2-SUBSTITUTED-4-(R)-HYDROXY-CYCLOPENTANE-1,3-DIONES

BACKGROUND OF THE INVENTION

1. Field of the Invention

This invention relates to the preparation of optically active compounds which are important intermediates in the synthesis of natural prostaglandins, their analogues and derivatives.

2. Description of the Prior Art

Sih et al. (J. Am. Chem. Soc., 95: 1676 [1973]; U.S. Pat. No. 3,773,622 [1973]) have disclosed a process for the microbiological conversion of a 2-substituted-cyclopentane-1,3,4-trione or a 2-substituted-3-alkoxy-cyclopent-2-ene-1,4-dione substrate to an optically active 2-substituted-4(R)-hydroxy-cyclopentane-1,3-dione wherein the use of the symbol R with respect to the 4-hydroxy group indicates the conformation of the latter according to the Cahn-Ingold-Prelog convention. The Sih et al. process utilizes a microorganism of the class Ascomycetes to effect the conversion of the substrate.

A specific example of this process includes the conversion of substrates having the general structural formulas

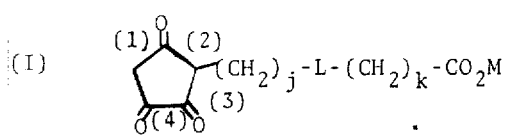
(I)

and

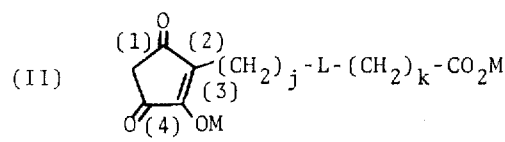
(II)

to a 2-substituted-4(R)-hydroxy-cyclopentane-1,3-dione,

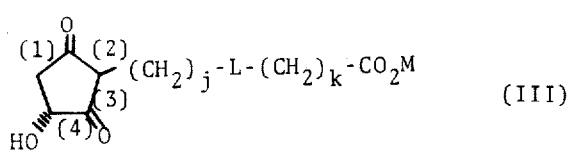
(III)

by a microorganism of the orders Endomycetales, Mucorales, Moniliales, or Eurotiales. In Formulas I, II, and III, L is an ethylene or vinylene radical, M is an alkyl group of from 1 to 4 carbon atoms, and $j$ and $k$ are integers having a value of from 1 to 4. In Formulas I, II, and III, the carbon atoms of the cyclopentane ring are numbered clockwise as indicated. In Formula III, the dashed line between $C_4$ of the cyclopentane ring and the oxygen atom of the 4-hydroxyl group indicates a valence bond which projects below the plane of the ring, thus structurally depicting the R-conformation in the Cahn-Ingold-Prelog convention.

A still more specific example of the Sih et al. process pertains to the conversion of a substrate such as 2-(6'-carbomethoxyhexyl)-cyclopentane-1,3,4-trione (Formula IV, below) or 2-(6'-carbomethoxyhexyl)-3-methoxy-cyclopent-2-ene-1,4-dione (Formula V, below) to 2-(6'-carbomethoxyhexyl)-4(R)-hydroxy-cyclopentane-1,3-dione (Formula VI, below) by the fermentative action of *Dipodascus uninucleatus* or *Schizosaccharomyces pombi*:

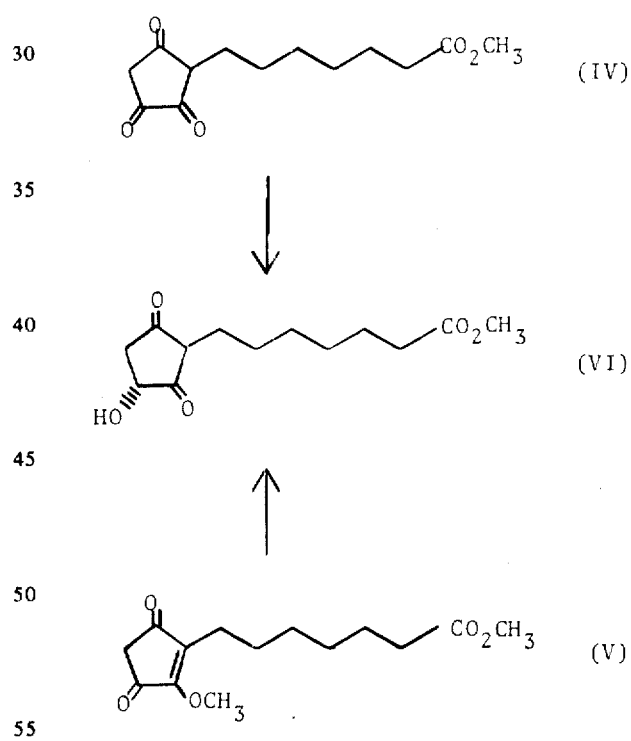

In Formula VI, the dashed line between the $C_4$ atom of the cyclopentane nucleus and the oxygen atom of the 4-hydroxyl group has the same significance as defined above for Formula III.

Specific conditions of the Sih et al. process include the following:

1. use of a soy-dextrose, cerelose-edamine, or dextran-cornsteep medium which has an initial carbohydrate concentration of from 0.1% to 0.5% and an initial adjusted pH of from 5 to 7;

2. incubation of a microorganism of the class Ascomycetes (specifically orders Endomycetales, Mucorales, Moniliales, or Eurotiales) in the medium until a concentration of the microorganism of 10% is obtained;

3. subsequent addition of a 2-substituted-cyclopentane-1,3,4-trione or a 2-substituted-3-alkoxy-cyclopentane-1,4-dione to the medium at a rate of about 0.2 gram per hour per 10 liters of medium; and, 4. recovery of the 2-substituted-4(R)-hydroxy-cyclopentane-1,3-dione from the medium by extraction with ethyl acetate.

In a typical run of 72 hours' duration, approximately 5 grams of substrate per 10 liters of medium can be converted to product.

Significantly, the Sih et al. process does not involve maintaining the carbohydrate concentration or the pH of the medium during the incubation of the microorganism or the addition of substrate.

SUMMARY OF THE INVENTION

The subject matter of this invention is an improved microbiological process of converting a 2-substituted-cyclopentane-1,3,4-trione or a 2-substituted-3-alkoxy-cyclopent-2-ene-1,4-dione substrate into an optically active 2-substituted-4(R)-hydroxy-cyclopentane-1,3-dione product by a microorganism of the class Ascomycetes, involving the following improvements:

1. incubating the microorganism in a medium having an initial carbohydrate concentration of from 2 to 6% and an initial pH of from 5 to 6 and maintaining a subsequent carbohydrate concentration of from 0.1 to 1% and a subsequent pH of from 4 to 5 until a concentration of the microorganism of from 20 to 35% is obtained;

2. adding the substrate to the medium at a rate of from 0.4 grams to 1.0 grams per hour per 10 liters of medium;

3. maintaining the subsequent carbohydrate concentration of the medium between 0.1% and 1.0% by batch or continuous feeding during the incubation step and the addition of substrate step; and 4. maintaining the subsequent pH of the medium between 4 and 5 during the incubation step and the addition of substrate step.

A more specific example of this invention includes the improved process of converting a substrate having the structural formula

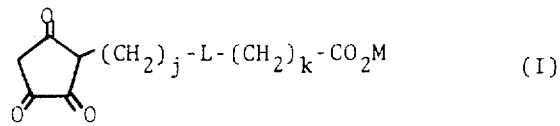
(I)

or

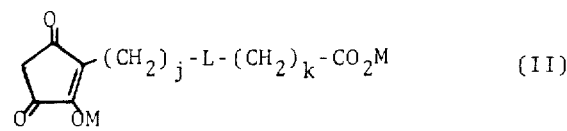
(II)

to a product of the formula

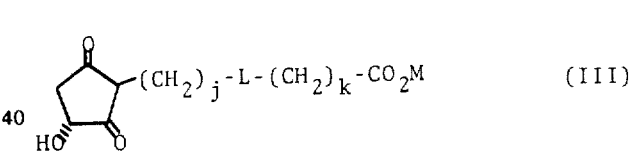
(III)

wherein L is an ethylene or vinylene radical, M is an alkyl group of from 1 to 4 carbon atoms, and $j$ and $k$ are integers having a value of from 1 to 4. As previously described, the dashed line between $C_4$ of the cyclopentane nucleus and the oxygen of the 4-hydroxy group indicates a valence bond, the direction of which projects below the plane of the cyclopentane ring, thus graphically representing the R-conformation. The conversion of substrates I or II to product III is accomplished by the fermentative action of a microorganism of the order Endomycetales, Mucorales, Moniliales or Eurotiales and includes the following improvements:

1. incubating the microorganism in a medium containing an initial glucose concentration of from 2 to 6%, casamino acids, yeast extract, and certain essential mineral salts, such as sodium citrate, potassium dihydrogen orthophosphate, ammonium nitrate, magnesium sulfate, and calcium chloride, and having a pH of from 4 to 5 until a concentration of the microorganism of from 20 to 35% is obtained, and maintaining a subsequent glucose concentration of from 0.1 to 1% and a subsequent pH of from 4 to 5 in the medium;

2. subsequently adding substrate I or II to the medium at a rate of from 0.4 gram to 1.0 gram per hour per 10 liters of medium;

3. maintaining the subsequent glucose concentration of the medium between 0.1% and 1.0% by batch or continuous feeding during the above steps; and 4. maintaining the subsequent pH of the medium between 4 and 5 during steps 1 and 2 hereof.

A detailed example of this invention relates to the improved process of converting a substrate such as 2-(6'-carbomethoxyhexyl)-cyclopentane-1,3,4-trione or 2-(6'-carbomethoxyhexyl)-3-methoxy-cyclopent-2-ene-1,4-dione to 2-(6'-carbomethoxyhexyl)-4(R)-hydroxy-cyclopentane-1,3-dione by the fermentative action of the microorganism *Dipodascus uninucleatus* or *Schizosaccharomyces pombi*, and includes the improvements:

1. incubating the microorganism in a medium comprising 3 gm sodium citrate, 5 gm anhydrous potassium dihydrogen orthophosphate, 3 gm anhydrous ammonium nitrate, 0.2 gm magnesium sulfate heptahydrate, 0.1 gm calcium chloride dihydrate, 5 gm yeast extract, 5 gm casamino acids, 40 gm glucose and 1 liter of water, and having a pH of from 5 to 6, and maintaining a subsequent glucose concentration of 0.1% and a subsequent pH of from 4.2 to 4.7 until a concentration of the microorganism of 25% in the medium is obtained;

2. subsequently adding the substrate to the medium at a rate of 0.5 gram per hour per 10 liters of medium;

3. maintaining the subsequent glucose concentration at 0.1% during above steps by batch or continuous feeding; and, 4. maintaining the subsequent pH of the medium between 4.2 and 4.7 during steps 1 and 2 hereof by addition of 1 M $KH_2PO_4$.

In a typical 72 hour run of this improved process, conversion of from 35 to 75 grams of substrate per 10 liters to product is possible.

The following microorganisms of the class Ascomycetes can be utilized in this improved process for the conversion of a 2-substituted-cyclopentane-1,3,4-trione or a 2-substituted-3-alkoxy-cyclopent-2-ene-1,4-dione to a 2-substituted-4(R)-hydroxy-cyclopentane-1,3-dione:

Order - Endomycetales

*Byssoclamys fulva*
*Dipodascus uninucleatus*
*Dipodascus aggregatus*
*Dipodascus albidus*
*Zygosaccharomyces priorianus*
*Zygosaccharomyces ashbya*
*Saccharomyces cerevisiae*
*Saccharomyces cerevisiae var. odessa*
*Saccharomyces cerevisiae fragilis*
*Saccharomyces cerevisiae acidifaciens*
*Saccharomyces cerevisiae lactis*
*Saccharomyces cerevisiae dobzanskii*
*Endomycopsis fibuliger*
*Endomycopsis javaanesis*
*Hansenula anomala*
*Schizosaccharomyces pombi*
*Schizosaccharomyces octosporum*

Order - Moniliales

*Rhodotorula aurantiaca*
*Rhodotorula pallida*
*Geotrichum candidum*
*Torulopsis pulcherrima*
*Candida krusei*
*Gliocladium fimbriatum*
*Gliocladium vermoeseni*
*Paecilomyces varioti*
*Stachybotrys lobulata*
*Trichoderma viride*
*Memnoniella echinata*
*Gliocladium roseum*
*Fusarium decemcellulare*
*Alternaria tenuis*
*Gliocladium catenulatum*

Order - Eurotiales

*Penicillium striatum*
*P. claviforme*
*P. pseudostromaticum*
*P. roqueforti*
*P. caseicolum*
*P. expansum*
*P. purpurogenum*
*P. varioti*
*P. frequentans*
*P. duclauxi*
*P. multicolor*
*P. sclerotiorum*
*P. granulatum*
*P. vermiculatum*
*P. terlikowskii*
*P. italicum*
*Aspergillus ustus*
*A. restrictus*
*A. ungins*
*A. terreus*
*A. luchensis*
*A. ornatus*

Order - Mucorales

*Absidia blakesleeana*
*Absidia regnieri*
*Mucor Rammannianus*
*Zygorhynchus heterogamus* (±)
*Pharmolomyces articulosus*
*Phycomyces blakesleeanus*

This improved process offers several unexpected advantages over the prior art process of Sih et al. Maintaining the subsequent carbohydrate concentration and the subsequent pH of the medium between 0.1 and 1.0% and 4 and 5, respectively, during the incubation of the microorganism and the addition of substrate steps results in a very rapid proliferation of the microorganism to a concentration of from 20 to 35% in the medium and in an increased conversion rate of substrate to product of from 0.4 to 1.0 grams per hour per 10 liters of medium. In the Sih et al. process, a concentration of microorganism of 10% and a conversion rate of about 0.2 gram of substrate per hour per 10 liters of medium represent the maximum parameters of the process. Hence, this improved process allows a 2- to 3-fold increase in the concentration of microorganism in the incubation step and a 2- to 3-fold increase in the rate of substrate conversion. Furthermore, the total amount of substrate which can be converted in a 72 hour period is from 35 to 80 grams per 10 liters of medium, or a 7- to 15-fold increase over that converted by the prior art process.

DESCRIPTION OF THE PREFERRED EMBODIMENTS

Example 1

A nutrient medium with the following composition was used for the incubation of the microorganism and conversion of substrate:

|  | gm/liter $H_2O$ |
|---|---|
| $Na_3$ Citrate | 3 |
| $KH_2PO_4$ (Anhydrous) | 5 |
| $NH_4NO_3$ (Anhydrous) | 2 |
| $MgSO_4.7\ H_2O$ | 0.2 |
| $CaCl_2.2\ H_2O$ | 0.1 |
| Yeast Extract | 5 |
| Casamino Acids | 5 |
| Glucose | 40 |

One loopful of the surface growth from a one week old malt extract agar slant of *Dipodascus uninucleatus* was used to inoculate 50 ml of the above medium in a 250 ml Erlenmeyer flask. The flask was incubated at 26°–32°C. and agitated at 300 rpm on a rotary shaker for 36 hrs. Thereafter, a 5% by volume transfer was made to a 2.8 liter Fernbach flask containing 1 liter of the same nutrient medium. After 24 hrs. of incubation, when the growth reached at least 25% solid, 400 mg of compound 2-(6'-carbomethoxyhexyl)-cyclopentane-1,3,4-trione was added in powder form to each Fernbach flask every 8 hrs. for the next 3 days. During the course of conversion, the medium pH was maintained within 4.2 – 4.5 by use of 1 M $KH_2PO_4$ and glucose concentration was kept within 0.1 – 0.4% by batch feeding of glucose. The conversion of 2-(6'-carbomethoxyhexyl)-cyclopentane-1,3,4-trione to 2-(6'-carbomethoxy)-4(R)-hydroxy-cyclopentane-1,3-dione was monitored periodically by extracting the sampled beer with 0.5 volume of ethyl acetate and spotting the residue (suspended in acetone) on thin layer chromatography plate using a solvent system comprising: 110 ml ethyl acetate; 50 ml isooctane; and 20 ml acetic acid. The substrate and product spots were detected with short wave UV. 72 hours after the first addition of substrate, the cells were removed by filtration. The supernatant was saturated with NaCl, acidified with HCl to pH 2.0, and extracted with one volume of ethyl acetate. The ethyl acetate phase was removed and evaporated to dryness. Recrystallization from ethyl acetate - petroleum ether yielded 2.8 g of product: m.p. 80°–86°C; $[\alpha]_D^{25} + 20.3$ ($CHCl_3$).

The use of 2-(6'-carbomethoxyhexyl)-3-methoxy-cyclopent-2-ene-1,4-dione in lieu of 2-(6'-carbomethoxyhexyl)-cyclopentane-1,3,4-trione as substrate yields 2'-(6'-carbomethoxyhexyl)-4(R)-hydroxy-cyclopentane-1,3-dione in substantially the same yield as above.

EXAMPLE 2

The procedure of Example 1 was scaled up in a 14 liter fermentor using the same medium. A 1-liter 24 hour growth of *Dipodascus uninucleatus* in a 2.8 liter Fernbach flask was used to inoculate 9 liter of medium placed in a 14 liter fermentor. The conditions for fermentation were: temperature, 30°C.; aeration, 5 liters of air/min.; agitation, 300 rpm.

Antifoam 130S was used to control foaming as needed. After 24 hours incubation, 4 g of 2-(6'-carbomethoxyhexyl)-cyclopentane-1,3,4-trione was added in powder every 8 hours for the next 72 hours. During the course of conversion, the medium pH was maintained within 4.2 – 4.5 by use of 1 M $KH_2PO_4$, and the glucose concentration was kept within 0.1 – 0.4% by batch feeding of glucose. 72 hours after the first addition of 2-(6'-carbomethoxyhexyl)-cyclopentane-1,3,4-trione, the cells were removed and the product, 2-(6'-carbomethoxyhexyl)-4(R)-hydroxy-cyclopentane-1,3-dione, was isolated as described in Example 1. The yield of the recrystallized product was 25.0 g; m.p. 89.5°–91°C; $[\alpha]_D^{25} + 19.1$ ($CHCl_3$).

In this Example, 2-(6'-carbomethoxyhexyl)-3-methoxy-cyclopent-2-ene-1,4-dione can be used as substrate without sacrifice of yield in product.

EXAMPLE 3

The procedure of Example 2 was repeated except that the substrate was dissolved in dimethylformamide (10 gm in 20 ml DMF) and fed continuously into the fermentor at the rate of 0.5 g/hr. The feeding was achieved by use of a teflon tubing attached to a syringe pump to circumvent the corrosive effect of DMF to tygon or rubber tubing. The rate of conversion employing continuous feeding was significantly higher than that by batch feeding: 36 grams in 60 hours compared to 36 grams in 70 hours.

What is claimed is:

1. In a microbiological process for converting a 2-substituted-cyclopentane-1,3,4-trione or a 2-substituted-3-alkoxy-cyclopent-2-ene-1,4-dione substrate into a 2-substituted-4(R)-hydroxy-cyclopentane-1,3-dione product utilizing a microorganism of the Class Ascomycetes, by incubating the microorganism in a medium having an initial carbohydrate concentration of from 2% to 6% and an initial pH of from 5 to 6 and subsequently adding the substrate to the incubated medium for conversion, the improvement comprising:

maintaining a subsequent carbohydrate concentration of from 0.1 to 1% and a subsequent pH of from 4 to 5 during incubation of the microorganism until a cell concentration of the microorganism of from 20% to 35% is obtained in the medium;

then adding the substrate to the incubated medium at a rate of from 0.4 gram to 1.0 gram per hour per 10 liters and maintaining said subsequent carbohydrate concentration and said subsequent pH of the medium during the entire microbiological conversion of substrate to product.

2. A process as in claim 1 wherein the substrate is selected from the group of compounds having the formula

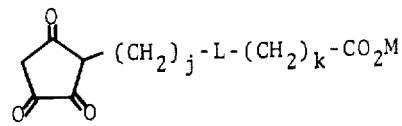

and

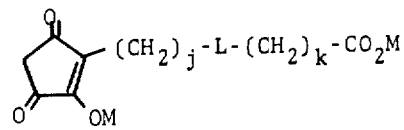

wherein L is selected from the group of ethylene and vinylene, M is alkyl of from 1 to 4 carbon atoms, and $j$ and $k$ are integers having a value of from 0 to 4.

3. A process as in claim 1 wherein said substrate is 2-(6'-carbomethoxyhexyl)-cyclopentane-1,3,4-trione.

4. A process as in claim 1 wherein said substrate is 2-(6'-carbomethoxyhexyl)-3-methoxy-cyclopent-2-ene-1,4-dione.

5. A process as in claim 1 wherein the rate of substrate addition is 0.5 gram per hour per 10 liters.

6. A process as in claim 1 wherein the carbohydrate concentration is 0.1% and the carbohydrate is glucose.

7. A process as in claim 1 wherein the carbohydrate concentration is maintained by batch feeding.

8. A process as in claim 1 wherein the carbohydrate concentration is maintained by continuous feeding.

9. A process as in claim 1 wherein said medium comprises: 3 g sodium citrate, 5 g anhydrous potassium dihydrogen orthophosphate, 2 g ammonium sulfate, 0.2 g magnesium chloride heptahydrate, 0.1 g calcium chloride dihydrate, 5 g yeast extract, 5 g casamino acids, 40 g glucose, and 1 liter of water.

10. A process as in claim 1 wherein the pH is maintained from 4.2 to 4.7.

11. A process as in claim 1 wherein said microorganism is *Dipodascus uninucleatus*.

* * * * *